(12) United States Patent
Farag et al.

(10) Patent No.: US 11,878,875 B2
(45) Date of Patent: Jan. 23, 2024

(54) COMB FOR SPACING APART A SERIES OF ARTICLES

(71) Applicants: Tawhid Farag, Pierrefonds (CA); Daniel Farag Zada, Pierrefonds (CA)

(72) Inventors: Tawhid Farag, Pierrefonds (CA); Daniel Farag Zada, Pierrefonds (CA)

(*) Notice: Subject to any disclaimer, the term of this patent is extended or adjusted under 35 U.S.C. 154(b) by 0 days.

(21) Appl. No.: 17/743,372

(22) Filed: May 12, 2022

(65) Prior Publication Data
US 2022/0363489 A1 Nov. 17, 2022

(30) Foreign Application Priority Data

May 17, 2021 (GB) .................................... 2107016

(51) Int. Cl.
*B65G 47/08* (2006.01)
*B65B 21/06* (2006.01)
*B65G 47/82* (2006.01)

(52) U.S. Cl.
CPC ........... *B65G 47/082* (2013.01); *B65B 21/06* (2013.01); *B65G 47/088* (2013.01); *B65G 47/82* (2013.01); *B65G 2201/0252* (2013.01)

(58) Field of Classification Search
CPC .......... B65G 2201/0244; B65G 47/088; B65G 47/82; B65G 47/082; B65B 21/06
USPC ................................ 198/429, 457.07, 459.1
See application file for complete search history.

(56) References Cited

U.S. PATENT DOCUMENTS

| | | | |
|---|---|---|---|
| 2,649,232 A | 8/1953 | Ferguson et al. | |
| 3,987,889 A * | 10/1976 | Godoy ................... | B65G 47/82 198/747 |
| 4,936,077 A | 6/1990 | Langen et al. | |
| 5,271,709 A * | 12/1993 | VanderMeer ........ | B65G 47/088 414/791.7 |
| 5,369,942 A | 12/1994 | Olson | |
| 5,638,665 A | 6/1997 | Mueller | |
| 5,741,343 A * | 4/1998 | Lloyd ..................... | C03B 35/10 198/429 |
| 6,164,041 A | 12/2000 | Focke et al. | |
| 8,534,450 B2 * | 9/2013 | Werner ................ | B65G 47/088 198/429 |
| 2004/0112714 A1* | 6/2004 | Davaillon ............ | B65G 47/082 198/470.1 |
| 2005/0061620 A1 | 3/2005 | Bonnain et al. | |
| 2010/0072027 A1 | 3/2010 | Duperray | |
| 2010/0140050 A1 | 6/2010 | Jacob et al. | |
| 2010/0193327 A1* | 8/2010 | Mougin ................. | B65G 47/82 198/429 |

FOREIGN PATENT DOCUMENTS

| | | | | |
|---|---|---|---|---|
| CN | 112265669 | * | 1/2021 | ............. B65B 21/06 |
| EP | 450915 | | 10/1991 | |
| EP | 1886921 | | 2/2008 | |
| EP | 2057089 | | 1/2011 | |
| EP | 3680183 | | 7/2020 | |
| WO | 2007120969 | | 12/2007 | |
| WO | 2009097546 | | 8/2009 | |
| WO | 2020236779 | | 11/2020 | |

* cited by examiner

*Primary Examiner* — James R Bidwell

(57) ABSTRACT

A comb for spacing apart articles. The comb includes protrusions defining recesses therebetween. At least one of the protrusion is longer than the protrusion located just in front of it. Also, a method of spacing apart articles.

16 Claims, 5 Drawing Sheets

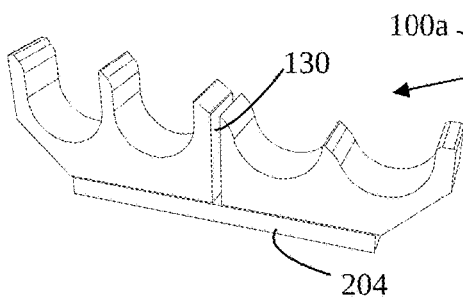
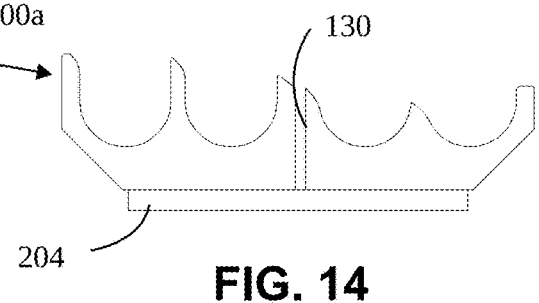
FIG. 13  FIG. 14
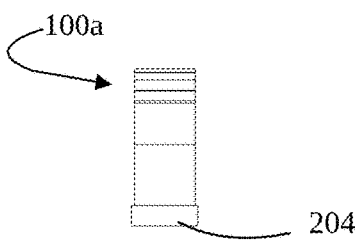
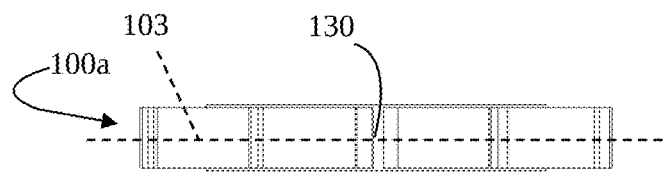
FIG. 15  FIG. 16
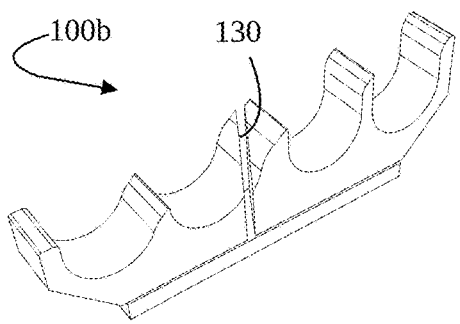
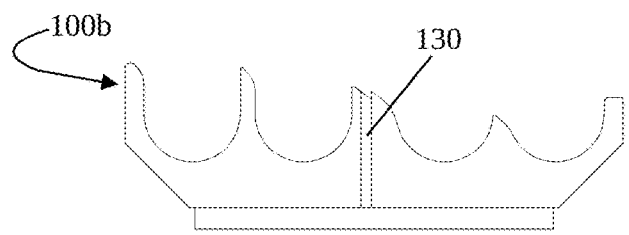
FIG. 17  FIG. 18
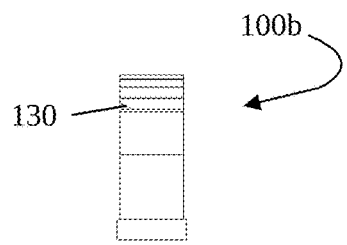
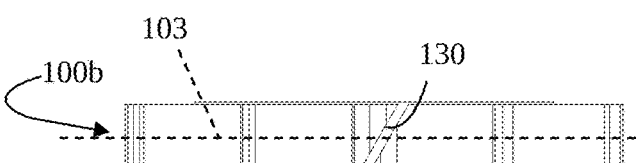
FIG. 19  FIG. 20

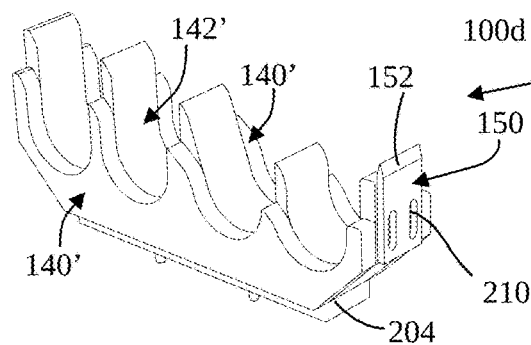
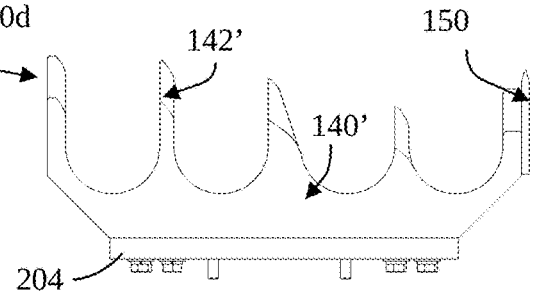
FIG. 26  FIG. 27
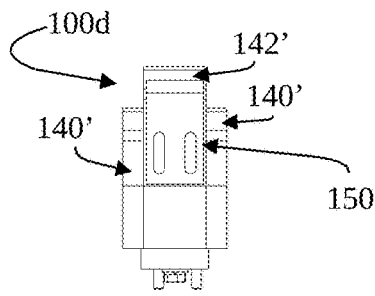
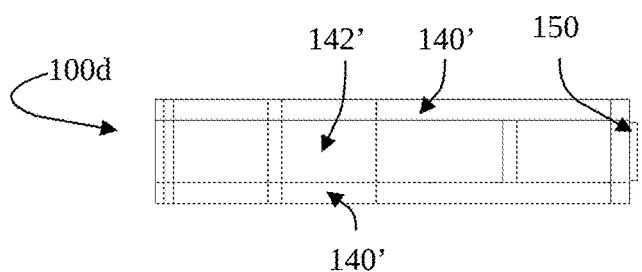
FIG. 28  FIG. 29
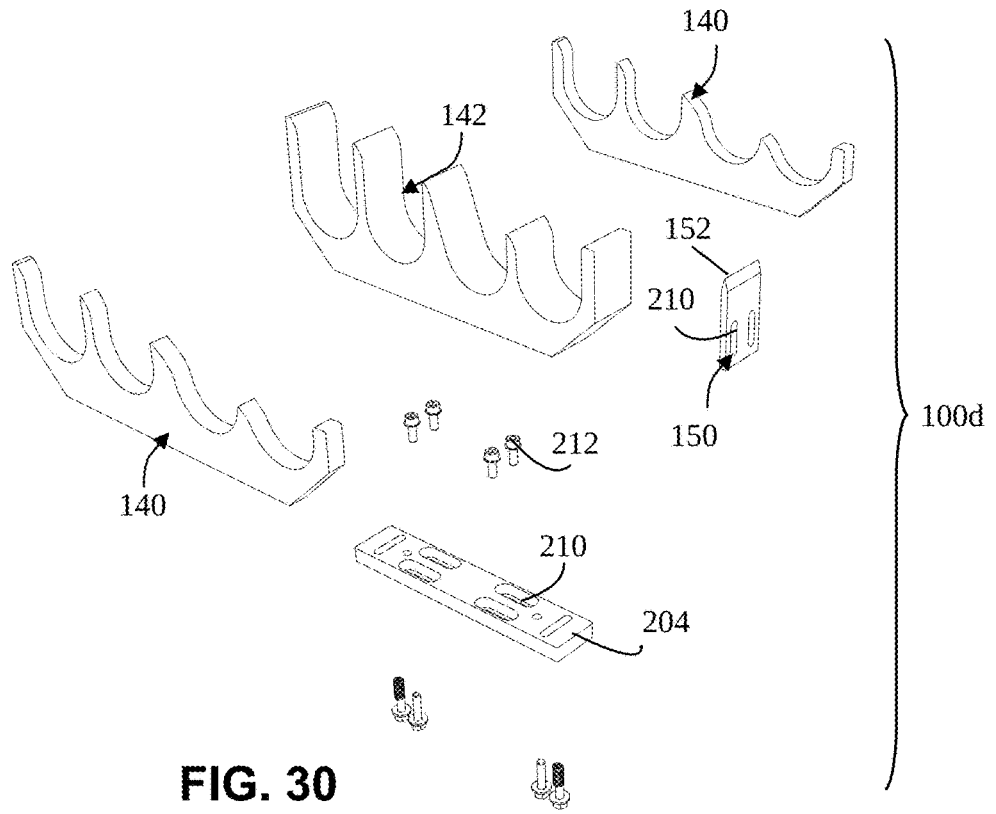
FIG. 30

COMB FOR SPACING APART A SERIES OF ARTICLES

FIELD OF THE INVENTION

The present invention relates to the general field of packaging and, more particularly, to a comb useful for spacing apart a series of articles disposed adjacent to each other into a different predetermined spaced apart arrangement.

BACKGROUND

Combs for handling articles such as beverage cans, bottles and the likes, prior to their packaging into boxes or engagement with blanks, are well known in the packaging industry. In some instances, known combs of the prior art are generally represented by a rigid one piece element defining a series of semi-circular recesses along a forward edge thereof. Using a suitable actuator, these types of combs are typically used to engage a series of articles that are readily disposed in a side-by-side arrangement that directly conforms to the series of recesses of the comb. In other instances, the comb includes automated components that dynamically adapt the recesses to a specific shape or dimension of articles to be handled.

However, existing combs are generally not well suited for use in certain situations. An example of such a situation is when, additionally to being handled through a packaging process, the articles in a series of contiguous articles further needs to be at least slightly spaced apart prior to a packaging operation. Another example of such a situation is when the series of articles to be handled are not readily disposed for proper engagement with the comb.

Thus, there is a need on the market for an improved comb that avoids the aforementioned disadvantages. An object of the present invention is therefore to provides such an improved comb.

SUMMARY OF THE INVENTION

In a broad aspect, there is provided a comb for spacing apart articles conveyed adjacent to each other along a rectilinear predetermined path in a back to front direction, the comb defining longitudinally opposed comb rear and front ends, the comb comprising: a base defining a longitudinally extending base line; and protrusions extending from the base longitudinally spaced apart from each other, each protrusion defining a respective free end opposed to the base, the protrusions defining recesses between adjacent ones of the protrusions, each recess defining a nadir, at least two of the nadirs being substantially at the base line, the protrusions each defining a respective length between the free end and the base line. At least one pair of the protrusions flanking one of the recesses includes a longer protrusion and a shorter protrusion, the shorter and longer protrusions having different lengths, the shorter protrusion being closer to the comb front end than the longer protrusion. When the articles are conveyed along the predetermined path and the comb is moved towards the articles substantially perpendicular to the predetermined path with the base line substantially parallel to the predetermined path, the longer protrusion engages the articles before the shorter protrusion so that a back article from the articles is stopped by the comb while a front article from the articles located in front of the back article is allowed to move forward until the shorter protrusion engages the front article.

There may also be provided a comb wherein the lengths of the protrusions decrease from a rearwardmost of the protrusions towards a frontwardmost of the protrusions, except for the frontwardmost protrusion, which is longer than a penultimate from the comb front end protrusion.

There may also be provided a comb wherein the nadirs are substantially equidistant from each other.

There may also be provided a comb wherein the recesses are substantially arcuate at the nadirs.

There may also be provided a comb wherein at least one the protrusions defines an arcuate cam surface extending frontwardly from the free end to guide the articles towards the nadir of an adjacent one of the recesses located in front of the at least one of the protrusions.

There may also be provided a comb wherein the at least one the protrusions defines a rear surface extending from the free end, the rear surface being substantially perpendicular to the base line and merging with the cam surface at the free end, the cam and rear surfaces defining a wedge at the free end.

There may also be provided a comb wherein the at least one protrusion defines a rear surface extending from the free end, the rear surface being substantially arcuate and merging with the cam surface at the free end to define a wedge at the free end.

There may also be provided a comb wherein the comb includes comb first and second portions selectively movable longitudinally relative to each other, the comb first and second portions splitting into two an intermediate one of the protrusions defined in part by each of comb the first and second portions, wherein moving the comb first and second portions adjusts a distance between nadirs provided on each side of the intermediate one of the protrusions.

There may also be provided a comb wherein the intermediate one of the protrusions is split in a splitting plane perpendicular to the base line.

There may also be provided a comb wherein the intermediate one of the protrusions is split in a splitting plane angled relative to the base line.

There may also be provided a comb wherein the protrusions are resiliently deformable, the comb further comprising a backing more rigid than the protrusions extending along part of the protrusions and shy of the free ends.

There may also be provided a comb further comprising a front end member more rigid than the protrusions extending at the comb front end, the front end member being longer than a frontwardmost one of the protrusions.

There may also be provided a comb wherein the comb defines opposed first and second lateral surfaces each extending longitudinally, the recesses and protrusions having a substantially constant cross-sectional configuration between the first and second lateral surfaces.

There may also be provided a comb wherein the first and second lateral surfaces are substantially parallel to each other and at least one of the nadirs is formed by a nadir line extending between the first and second lateral surfaces perpendicular thereto.

There may also be provided a comb wherein all the nadirs are substantially at the base line.

In another broad aspect, there is provided a method of spacing apart articles, the method comprising: advancing the articles adjacent to each other along a predetermined path; spacing apart from each other in a predetermined arrangement a subset of the articles, the subset including a rearwardmost article and a frontwardmost article, wherein spacing apart the articles includes engaging successively each article from the rearwardmost article to the frontwardmost article one after the other so that the articles from the subset behind the article that is engaged at any time remain fixed, while articles in front of the article that is engaged move forward; whereby the articles from the subset are stopped from advancing one after the other until all of the articles from the subset are in an arrangement wherein the articles from the subset are spaced apart from each other by a larger distance than before the articles have been engaged.

There may also be provided a method wherein engaging the articles is performed using a comb that is moved in a direction substantially perpendicular to the articles to engage the articles one after the other.

There may also be provided a method wherein the articles are conveyed substantially horizontally and the comb is also moved substantially horizontally.

There may also be provided a method wherein the comb is moved continuously while the articles from the subset are engaged.

There may also be provided a method wherein the articles are substantially cylindrical and abut against each other prior to spacing.

In yet another broad aspect, there is provided an apparatus for spacing apart articles, the apparatus comprising: a conveyor for moving the articles therealong in a predetermined rectilinear path in a back to front direction; a comb defining comb rear and front ends longitudinally spaced apart from each other, the comb including a base; and protrusions extending from the base longitudinally spaced apart from each other, each protrusion defining a respective free end opposed to the base, the protrusions defining recesses between adjacent ones of the protrusions, each recess defining a nadir, the nadirs being located along a rectilinear base line, the protrusions each defining a respective length between the free end and the base line. At least one pair of the protrusions flanking one of the recesses includes a longer protrusion and a shorter protrusion, the shorter and longer protrusions having different lengths, the shorter protrusion being in front of the longer protrusion. The comb is mounted to a linear actuator with the base line substantially parallel to the conveyor, the linear actuator being operable to move the comb in a direction substantially perpendicular to the predetermined rectilinear path. In operation, the articles are conveyed along the predetermined path and the comb is moved in a reciprocating motion by the linear actuator to engage successively subsets of the articles to space apart the articles within each subset.

Thus, as the comb is moving toward the comb second position, the longest comb protrusion closest to the comb first end is first to contact a corresponding lateral side surface portion of the article in the group.

The following comb protrusions distributed toward the comb second end being gradually shorter in length, the side-by-side arrangement of articles is freely urged toward the comb second end.

Hence, in successive order, the next longest comb protrusion urges the remaining side-by-side arrangement of articles toward the comb second end until each article is engaged, and freely lands in, its respective comb recess of the comb.

Thus, a group of articles disposed in a contiguous side-by-side arrangement may be spaced apart relative to one another in a predetermined spacing arrangement.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 13, in a perspective view, illustrates an alternative embodiment of the comb;

FIG. 14, in a top plan view, illustrates the comb shown in FIG. 13;

FIG. 15, in a front plan view, illustrates the comb shown in FIG. 13;

FIG. 16, in a side plan view, illustrates the comb shown in FIG. 13;

FIG. 17, in a perspective view, illustrates another alternative embodiment of the comb;

FIG. 18, in a top plan view, illustrates the comb shown in FIG. 17;

FIG. 19, in a front plan view, illustrates the comb shown in FIG. 17;

FIG. 20, in a side plan view, illustrates the comb shown in FIG. 17;

FIG. 26, in a perspective view, illustrates yet another alternative embodiment of the comb;

FIG. 27, in a top plan view, illustrates the comb shown in FIG. 26;

FIG. 28, in a front plan view, illustrates the comb shown in FIG. 26;

FIG. 29, in a side plan view, illustrates the comb shown in FIG. 26;

FIG. 30, in an exploded perspective view, illustrates the comb shown in FIG. 26;

DETAILED DESCRIPTION

Figure 1:
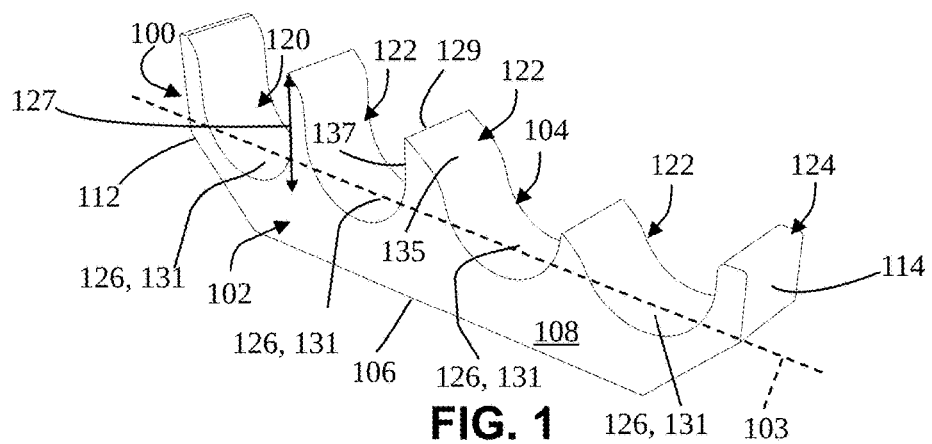
FIG. 1, in a perspective view, illustrates an embodiment of a comb, according to the present invention.
Figure 2:
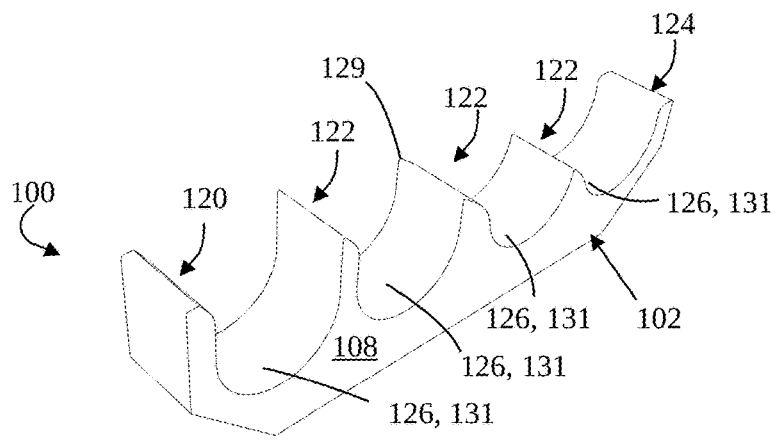
FIG. 2, in a perspective view, illustrates the comb shown in FIG. 1, as seen from a different angle.

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. Also, directional terminology, such as "top" and "bottom", is used with reference to a typical use of the proposed comb in which articles to arrange are conveyed horizontally. This terminology is used for convenience and should not be used to unduly restrict the scope of the present invention.

The present application claims benefit from UK patent application 2107016.4 filed May 17, 2021, the contents of which is hereby incorporated by reference in its entirety.

FIGS. 1 to 7 illustrates various aspects of an embodiment of a comb 100. As seen in FIGS. 8 to 12, the comb 100 is usable for spacing apart articles 200 in a group 201 of articles 200 such that they adopt a predetermined arrangement in which there is a predetermined spacing requirement between them. The articles 200 are conveyed adjacent to each other, either abutting each other or in close proximity to each other, along a predetermined rectilinear path in a back to front direction. The predetermined rectilinear path may be defined by a conveyor 207 on which the articles 200 are conveyed. In alternative embodiments, the articles 200 are not actively each conveyed, but are instead moved forward either by pushing on rearward located articles 200 or move forward by gravity, among other possibilities. The articles 200 are also typically abutting against a back wall 202 or an equivalent member located opposite the group of articles 200 relative to the comb 100. The conveyor 207 is only shown in FIG. 8 so as to not clutter too much FIGS. 8 to 12. It should be understood that the conveyor 207, when present is not removed while the comb 100 is used but remains present.

The articles 200 are typically closely similar in shape configuration and dimensions relative to one another in the group 201 of articles 200. In some embodiments, the articles 200 define a substantially rounded peripheral side surfaces in cross-section at a point of contact with the comb 100. For example, the articles 200 are substantially cylindrical, or include a portion thereof that is cylindrical. However, articles 200 having other shapes may also be handled by the comb 100.

The comb 100 is in some embodiments adjustably mounted on a mounting plate 204 or equivalent, which, in turn, is connected to a linear actuator 205 (represented schematically in FIGS. 8 to 12) used for moving the comb 100 toward and away from the group of articles 200. The actuator 205 may be mechanically linked to the conveyor 207 so that a purely mechanical action is used to move the comb 100 each time a new group 201 of articles 200 is suitably positioned adjacent the comb 100. In other embodiments, the linear actuator 205 is controlled by a controller linked to sensors that controls the movements of the actuator 205. The manner of controlling the movements of the comb 100 may be any suitable manner known in the art.

Referring collectively to FIGS. 1 to 7, the comb 100 defines longitudinally opposed comb rear and front ends 112 and 114. The comb 100 includes a base 102 defining a base line 103 extending longitudinally therealong. The comb 100 also defines opposed comb top and bottom surfaces 108 and 110 extending between the comb rear and front ends 112 and 114 and opposed article engaging and mounting surfaces 104 and 106 extending between the comb rear and front ends 112 and 114. The article engaging surface 104 is shaped and sized for abuttingly contacting and laterally spacing apart relative to one another the articles 200 in the group 201, while the mounting surface is used to mount the mounting plate 204 to the comb 100. It should be noted that reference to the comb top and bottom surfaces 108 and 110 refers to an orientation of the comb 100 when the latter is moved horizontally to engage the articles 200. If the orientation of the comb 100 is different in an alternative embodiment, the comb top and bottom surfaces 108 and 110 will not be at the top and bottom of the comb 100 when the latter is in use.

The comb 100 also includes protrusions 120, 122 and 124 extending from the base 102 longitudinally spaced apart from each other. Each protrusion 120, 122 and 124 defines a respective free end 129 opposed to the base 102, and the protrusions 120, 122 and 124 define recesses 126 between adjacent ones of the protrusions 120, 122 and 124. Each recess 126 defines a nadir 131, at least two of the nadirs 131 being substantially at the base line 103. When the comb 100 is moved horizontally, the nadir is not at the vertically lowest point, but is simply the deepest point in the recesses 126 relative to the protrusions 120, 122 and 124, in that case in the horizontal direction. In some embodiments, all the nadirs 131 are at the base line 103 so that the recesses 126 are all tangential to the base line 103. In the comb 100, the nadirs 131 are substantially equidistant from each other. However, in alternative embodiments, as described below, this is not necessarily the case. The distance between the nadirs 131 depends on the arrangement of articles 200 that the comb 100 is intended to produce. Also, the recesses 126, are in some embodiments substantially arcuate at the nadirs 131, but here again, this might not hold for all embodiments of the invention. Arcuate nadirs 131 are well-suited to handle, for example, cylindrical articles 200. In some embodiments, the recesses and protrusions have a substantially constant cross-sectional configuration between the comb top and bottom surfaces 108 and 110. For example, the comb top and bottom surfaces 108 and 110 are substantially parallel to each other and at least one of the nadirs 131 is formed by a nadir line extending between the comb top and bottom surfaces 108 and 110 perpendicular thereto.

The protrusions 120, 122 and 124 each define a respective length 127 (shown for one of the protrusion 122 in FIG. 1) between the free end 129 and the base line 103. The article engaging surface 104 defines a contour of the protrusions 120, 122 and 124 and of the recesses 126. The protrusions 120 include a rearwardmost protrusion 120, typically located at the comb rear end 112, a frontwardmost protrusion 124, typically located at the comb front end 114, and one or more intermediate protrusions 122 located therebetween.

The number of recesses 126 corresponds to the number of articles 200 in the group of articles 200 to be spaced apart relative to one another. Each recess 126 is compatibly shaped and sized for freely engaging therein a peripheral surface portion of a respective article 200 in the group 201 of articles 200.

Figure 3:
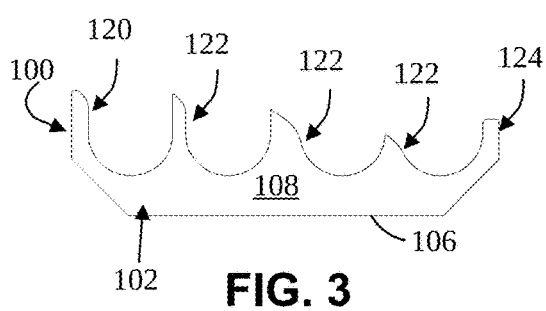
FIG. 3, in a top plan view, illustrates the comb shown in FIG. 1, a bottom view being a mirror image thereof.
Figure 4:
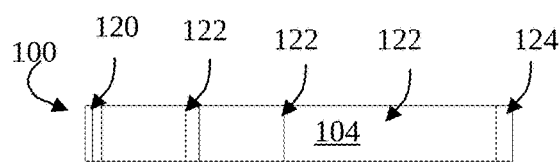
FIG. 4, in a first side plan view, illustrates the comb shown in FIG. 1.
Figures 5, 6:
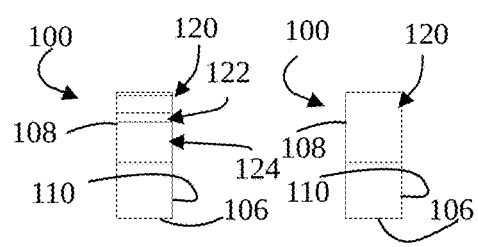
FIG. 5, in a front plan view, illustrates the comb shown in FIG. 1.
FIG. 6, in a rear plan view, illustrates the comb shown in FIG. 1.
Figure 7:
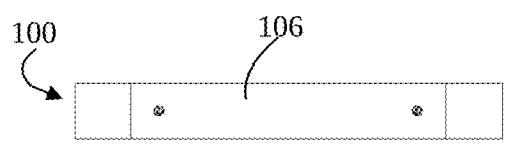
FIG. 7, in a second side plan view, illustrates the comb shown in FIG. 1.

As illustrated for example in FIG. 3, at least one pair of the protrusions 120, 122 and 124 flanking one of the recesses 126 includes a longer protrusion and a shorter protrusion, the shorter protrusion being closer to the comb front end 114 than the longer protrusion. For example, protrusion 120 is longer than the protrusion 122 that is adjacent thereto. Typically, the protrusions 120, 122 and 124 have lengths that decrease from the rearwardmost protrusion 120 towards the frontwardmost protrusion 124, except for the frontwardmost protrusion 124, which is longer than a frontwardmost one of the intermediate protrusions 122.

At least one of the protrusions 120, 122, 124, and typically all the protrusions except for the frontwardmost protrusion 124 defines an arcuate cam surface 135, which may be for example convex, extending frontwardly from the free end 129 to guide the articles 200 towards the nadir 131 of an adjacent one of the recesses 126. The protrusions 120, 122, also define a rear surface 137. The rear surface 137 extends from the free end 129 and may be substantially perpendicular to the base line 103 or substantially arcuate, for example concave. The rear surface 137 typically merges with the cam surface 137 to define a wedge at the free end 129.

Figure 8:
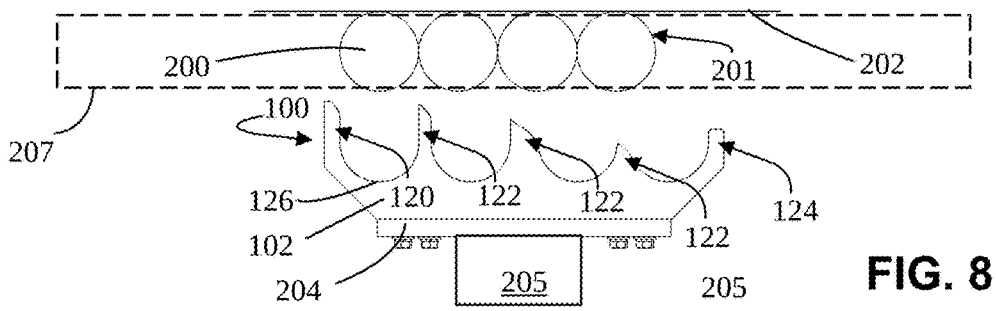
FIG. 8, in a top plan view, illustrates a first step in a method of using the comb shown in FIG. 1 to arrange articles.
Figure 9:
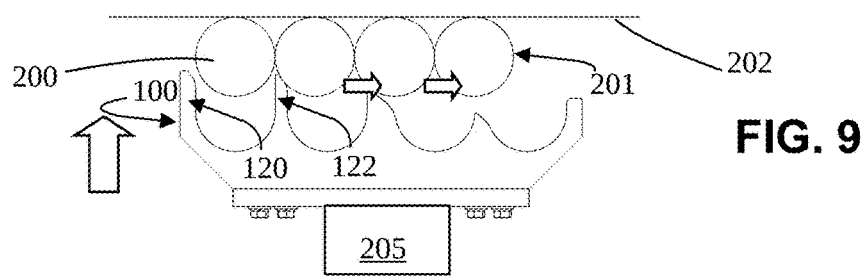
FIG. 9, in a top plan view, illustrates a second step in the method of using the comb.
Figure 10:
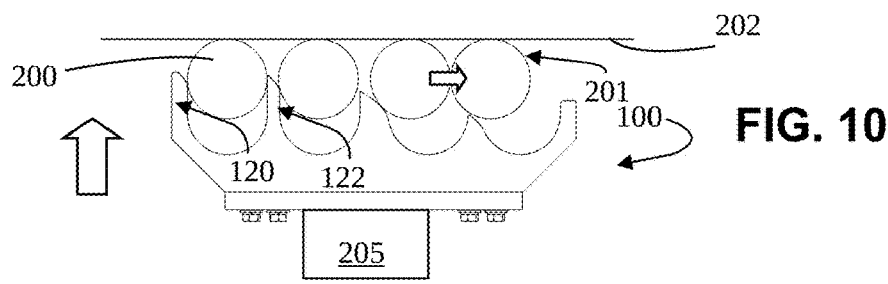
FIG. 10, in a top plan view, illustrates a third step in the method of using the comb.
Figure 11:
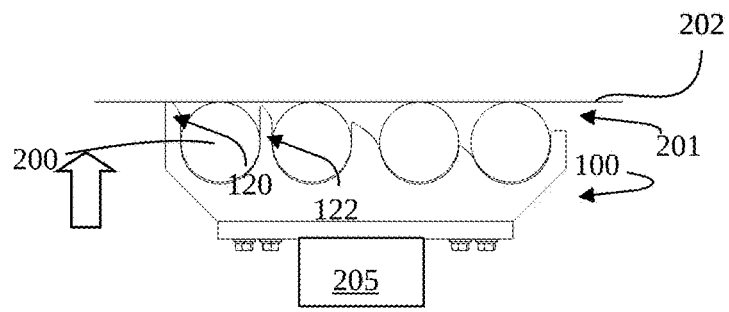
FIG. 11, in a top plan view, illustrates a fourth step in the method of using the comb.
Figure 12:
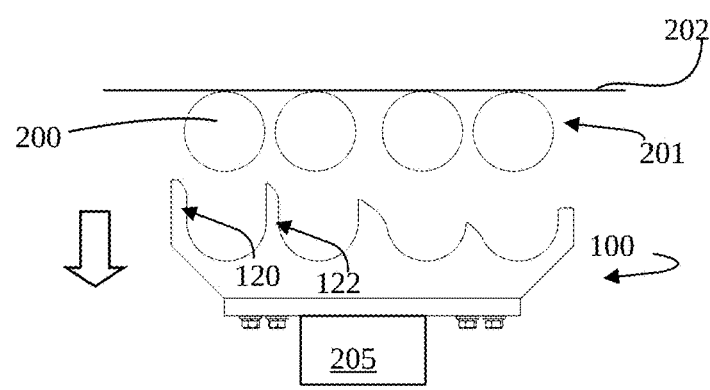
FIG. 12, in a top plan view, illustrates a fifth step in the method of using the comb.

The comb 100 is movable between a comb first position and a comb second position by the actuator 205. In the comb 100 first position, as illustrated in FIG. 8, the comb 100 is at least slightly spaced apart from the group 201 of articles 200, and a rearwardmost one of the articles 200 in the group 201 of articles 200 is located substantially in register with a rearwardmost one of the recesses 126. In the comb second position, as illustrated in FIG. 11, the comb 100 has each of its recesses 126 engaging a respective article 200 in the group 201, with each article 200 being spaced apart from adjacent ones a predetermined distance.

Thus, as illustrated in sequence through FIGS. 8 to 12, as the comb 100 is moving toward the comb second position, the rearwardmost protrusion 120, the longest one, is first to contact a corresponding lateral side surface portion of the rearwardmost one of the articles 200 in the group 201. The following intermediate protrusions 122 distributed toward the comb front end 114 are gradually shorter in length and therefore engage the articles 200 one after the other as the side-by-side arrangement of articles 200 is conveyed toward the comb front end 114.

Hence, in successive order, the next longest protrusion 122 urges the remaining side-by-side arrangement of articles 200 toward the comb front end 114 until each article 200 is engaged, and freely lands in, its respective recess 126 of the comb 100. The articles 200 from the group 201 behind the article 200 that is currently in the process to be engaged remain fixed relative to the comb 100, while articles 200 in front of the article 200 that is currently engaged move forward relative to the comb 100. This forward movement may be due to the action of the protrusions 120, 122 and 124 on the articles 200, to an external movement created by a conveyor 207, or to both of these actions. Thus, the articles 200 are stopped from advancing one after the other until all of the articles 200 from the group 201 are in an arrangement wherein the articles 200 from the group 201 are spaced apart from each other by a larger distance than before the articles 200 have been engaged.

The progressively shorter and shorter protrusion 120 and 122 allows for a relatively faster movement of the comb 100 between the comb first and second positions than compared to a comb with equal length protrusions. Thus, faster packaging operations may be achieved compared to known combs used for handling and spacing apart articles 200 in the packing industry. In some embodiments, the comb 100 and the articles 200 are moved substantially horizontally, but other orientations are within the scope of the invention. Also, the comb 100 may be moved substantially continuously as the articles 200 are engaged, and withdraw once the right arrangement has been achieved, to obtain the configuration of FIG. 12.

As would be familiar to someone versed in the art of packaging regular shaped articles, the comb 100 may include a relatively small number of recesses 126 for spacing apart relatively heavy weighted articles 200, such as filled aluminum beverage cans. Alternatively, the comb 100 may include a relatively high number of recesses 126 for spacing apart relatively light weight articles 200 such as empty aluminum beverage cans or the like. The comb 100 of the present invention is particularly suitable for spacing apart regular shaped articles 200 such as substantially cylindrical beverage cans or other similar shaped articles, prior to engaging a carton or plastic blank around a top contour ledge thereof or inserting the articles in a box provided with inner separators panels.

Although the present invention has been demonstrated for spacing apart cylindrical articles, it would be obvious to someone familiar with packaging equipment that other comparatively shaped articles can be processed using the comb 100, as long as a small recess allows insertion of the protrusions 120, 122 and 124 between the articles 200. The articles may even abut against each other and be of general a square or rectangular configuration if they have substantially rounded corners.

In some embodiments, according to the present invention, the comb 100 includes between 2 and 8 recesses 126, for spacing a corresponding number of articles 200 in the group 201 of articles 200. As exemplified in the figures, the comb 100 comprises five comb protrusions 120, 122 and 124 spaced apart by four comb recesses 126. In some embodiments, a central comb protrusion 122 has a relatively wider dimension than adjacent ones of the comb protrusions 122 for forcing a wider space between two sub-groups of two articles 200. Other numbers of comb protrusions and relative width thereof are also possible.

In some embodiments, the base 102 and the protrusions 120, 122 and 124 are formed integrally with each other as a single piece element made of a substantially rigid material. For example, a substantially rigid polymeric material, such as a rigid Nylon®, PVC, ABS, or the like, aluminum, steel, a suitable metal alloy, or the likes. In some embodiments, the article engaging surface 104 of the comb 100 is covered with a resilient cushioning layer for protecting the surface of the articles 200 from damaging impacts with the comb 100.

Referring to FIGS. 13 to 20 inclusively, in some embodiments of the comb 100a (seen in FIGS. 13 to 16) and 100b (seen in FIGS. 17 to 20), the base 102 defines at least one separation cut 130 extending along a splitting plane extending substantially transversally throughout the comb 100a or 100b relative thereto, thus defining two or more comb portions.

Thus, with each one in the two or more comb portions adjustably mounted to a mounting plate 204 or the like through suitable elongated slots 210 and set screws 212 (as exemplified in FIGS. 25 and 30), the distance between the comb rear and front ends 112 and 114 may be user selected so as to space apart the articles 200 into sub-groups of articles 200 by varying a distance between the nadirs 131 located on each side of the separation cut 130. As exemplified in the figures, a group of four articles 200 may be spaced apart into two equally spaced apart sub-groups of articles 200. The separation cut 130 typically splitting into two an intermediate protrusion 122 defined in part by each of the comb portions, In some embodiments, at least one of the at least one separation cut 130 extends perpendicularly transversally relative to the base line 103, as exemplified in FIGS. 13, 14, 15 and 16. In other embodiments, at least one of the at least one separation cut 130 extends at an oblique angle relative to the base line 103, as exemplified in FIGS. 17 and 20, and perpendicularly transversally between the two comb portions as exemplified in FIG. 18. In some embodiments, the at least one separation cut 130 extends through the base 102 at a location between the comb rear and front ends 112 and 114 that is substantially in register with a longitudinal centered portion of one of the at least one protrusion 122.

The oblique separation cut 130 is useful for avoiding impact marks into tin walled articles such as aluminum beverage cans and the like, when the comb 100 is moved from the first to the second position.

In some embodiments, the protrusions 120, 122 and 124 are resiliently deformable and the comb 100c or 100d further comprises a backing more rigid than the protrusions 120, 122 and 124 extending along part of the protrusions 120, 122 and 124 shy of the free ends 129. More specifically, referring to FIGS. 26 to 30 inclusively, in some embodiments, the comb 100d includes a pair of plate members 140' extending in a parallel and spaced apart relationship relative to one another. The plate members 140' form the backing. The comb 100 includes a core member 142' extending parallel and contiguously between the pair of plate members 140'. The core member 140' defines the protrusions 120, 122 and 124. The pair of plate members 140' is shaped similarly to the core member 142' and therefore defines protrusions, which however extend shy of the protrusions of the core member 142.

Referring to FIGS. 21 to 25, in some embodiments, the core member 142 is made of a substantially rigid material and has relatively shorter comb protrusions, while the pair of plate members 140 is made of an at least slightly more resiliently flexible material and has relatively longer protrusions than the core member 142.

Figure 21:
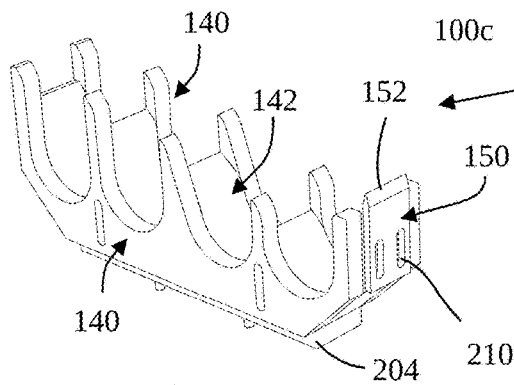
FIG. 21, in a perspective view, illustrates yet another alternative embodiment of the comb.
Figure 22:
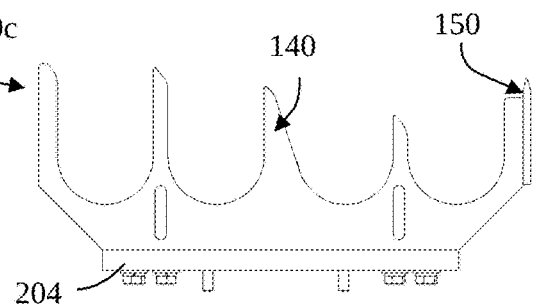
FIG. 22, in a top plan view, illustrates the comb shown in FIG. 21.
Figure 23:
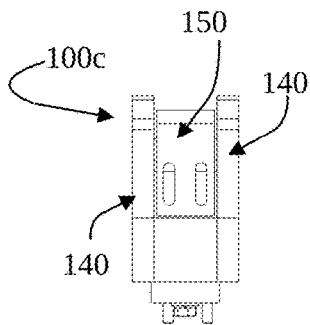
FIG. 23, in a front plan view, illustrates the comb shown in FIG. 21.
Figure 24:
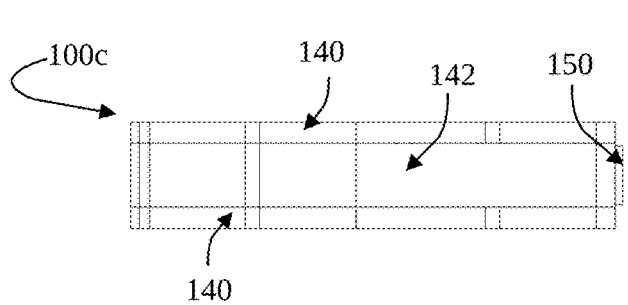
FIG. 24, in a side plan view, illustrates the comb shown in FIG. 21.
Figure 25:
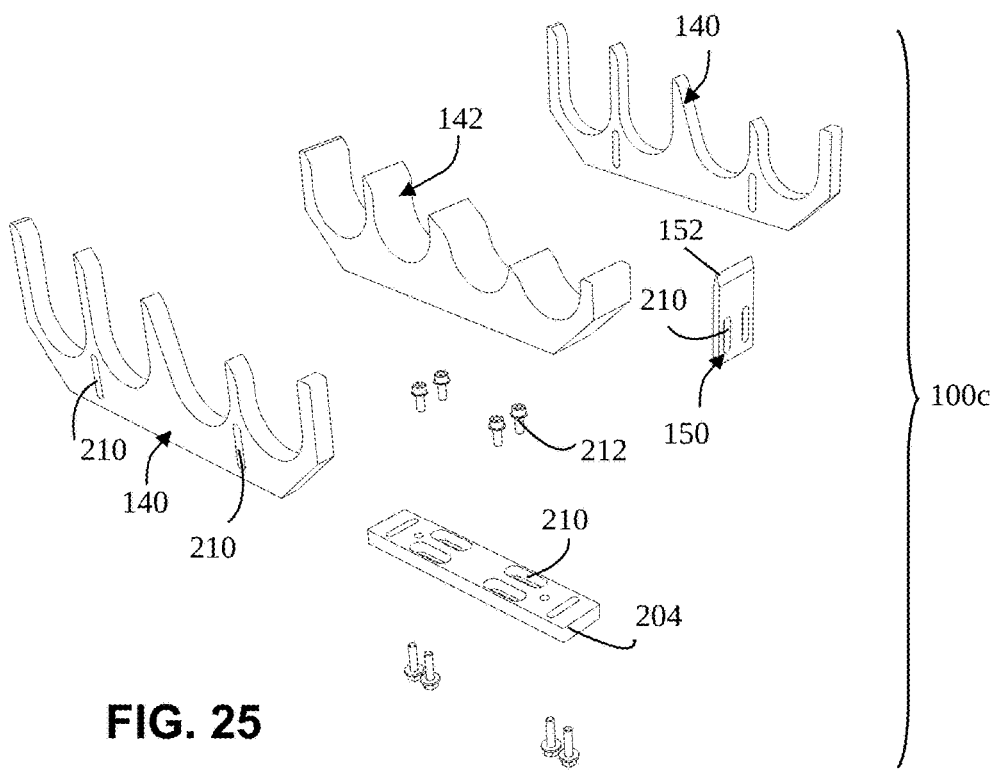
FIG. 25, in an exploded perspective view, illustrates the comb shown in FIG. 21.

Referring more particularly to FIGS. 21, 22 and 25, in some embodiments, each one in the pair of plate members 140 is user selectably adjustable relative to the core member 142 parallel along a direction along which the comb 100c is moved in use. Thus, the protrusions of the plate members 140 may extend more or less relative to the protrusions of the core member 142. For example, each plate member 140 in the pair may be provided with suitable adjustment slots 210 and set screws (not shown in the figures) for selectively adjusting the position thereof relative to the core member 142. Other adjustable arrangements for the plate members 140 are also possible.

Still referring to FIGS. to 21, 22 and 25, in some embodiments, the comb 100 further comprises an adjustable end member 150. The adjustable end member 150 has a plate like configuration adjustably and coplanarly connected at the front of the core member 142. The adjustable end member 150 defines an acute edge 152 extending generally transversally relative to the longitudinal direction.

The adjustable end member 150 is suitably configured such that the end member acute edge 152 is user selectively positionable so as to protrude more or less distally away relative to the acute end of the frontwardmost protrusion 124, and substantially in register with the free end of the rearwardmost protrusion 120. The adjustable end member 150 is further user selectively positionable such that its acute edge 152 abuts against the back wall 202 substantially concurrently or prior to the contact of the rearwardmost protrusion 120 therewith.

Thus, when the comb 100 is moved from the comb first to the second position, the adjustable end member 150 secures the last article 200 in the group of articles 200 within alignment with the comb 100 prior to the lateral movement of some or all of the articles towards the frontwardmost protrusion 124. Furthermore, the frontwardmost article 200 is prevented from being pushed or bumped laterally out of the group of articles 200 in front of the comb 100 due to an excessive velocity or force in the movement of the comb 100 towards the second position. Still furthermore, the resiliently flexible arcuate end of the rearwardmost protrusion 120 is prevented from being excessively pressed against the back wall 202 when the comb 100 has reached the comb second position.

As exemplified in the figures, the adjustable end member 150 may be adjustably connected to the remainder of the comb 100c through suitably configured adjustment slots 210 and set screws. Other equivalent assemblies for the adjustable end member 150 are also possible.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A comb for spacing apart articles conveyed adjacent to each other along a rectilinear predetermined path in a back to front direction, the comb defining longitudinally opposed comb rear and front ends, the comb comprising:
   a base defining a longitudinally extending base line; and
   protrusions extending from the base longitudinally spaced apart from each other, each protrusion defining a respective free end opposed to the base, the protrusions defining recesses between adjacent ones of the protrusions, each recess defining a nadir, at least two of the nadirs being substantially at the base line, the protrusions each defining a respective length between the free end and the base line;
   wherein at least one pair of the protrusions flanking one of the recesses includes a longer protrusion and a shorter protrusion, the shorter and longer protrusions having different lengths, the shorter protrusion being closer to the comb front end than the longer protrusion;
   wherein, when the articles are conveyed along the predetermined path and the comb is moved towards the articles substantially perpendicular to the predetermined path with the base line substantially parallel to the predetermined path, the longer protrusion engages the articles before the shorter protrusion so that a back article from the articles is stopped by the comb while a front article from the articles located in front of the back article is allowed to move forward until the shorter protrusion engages the front article.

2. The comb as defined in claim 1, wherein the lengths of the protrusions decrease from a rearwardmost of the protrusions towards a frontwardmost of the protrusions, except for the frontwardmost protrusion, which is longer than a penultimate from the comb front end protrusion.

3. The comb as defined in claim 1, wherein the nadirs are substantially equidistant from each other.

4. The comb as defined in claim 1, wherein the recesses are substantially arcuate at the nadirs.

5. The comb as defined in claim 1, wherein at least one of the protrusions defines an arcuate cam surface extending frontwardly from the free end to guide the articles towards the nadir of an adjacent one of the recesses located in front of the at least one of the protrusions.

6. The comb as defined in claim 5, wherein the at least one of the protrusions defines a rear surface extending from the free end, the rear surface being substantially perpendicular to the base line and merging with the cam surface at the free end, the cam and rear surfaces defining a wedge at the free end.

7. The comb as defined in claim 5, wherein the at least one protrusion defines a rear surface extending from the free end, the rear surface being substantially arcuate and merging with the cam surface at the free end to define a wedge at the free end.

8. The comb as defined in claim 1, wherein the comb includes comb first and second portions selectively movable longitudinally relative to each other, the comb first and second portions splitting into two an intermediate one of the protrusions defined in part by each of comb the first and second portions, wherein moving the comb first and second portions relative to each other adjusts a distance between nadirs provided on each side of the intermediate one of the protrusions.

9. The comb as defined in claim 8, wherein the intermediate one of the protrusions is split in a splitting plane perpendicular to the base line.

10. The comb as defined in claim 8, wherein the intermediate one of the protrusions is split in a splitting plane angled relative to the base line.

11. The comb as defined in claim 1, wherein the protrusions are resiliently deformable, the comb further comprising a backing more rigid than the protrusions extending along part of the protrusions and shy of the free ends.

12. The comb as defined in claim 11, further comprising a front end member more rigid than the protrusions extending at the comb front end, the front end member being longer than a frontwardmost one of the protrusions.

13. The comb as defined in claim 1, wherein the comb defines opposed first and second lateral surfaces each extending longitudinally, the recesses and protrusions having a substantially constant cross-sectional configuration between the first and second lateral surfaces.

14. The comb as defined in claim 13, wherein the first and second lateral surfaces are substantially parallel to each other and at least one of the nadirs is formed by a nadir line extending between the first and second lateral surfaces perpendicular thereto.

15. The comb as defined in claim 1, wherein all the nadirs are substantially at the base line.

16. An apparatus for spacing apart articles, the apparatus comprising:
  a conveyor for moving the articles therealong in a predetermined rectilinear path in a back to front direction;
  a comb defining comb rear and front ends longitudinally spaced apart from each other, the comb including
    a base; and
    protrusions extending from the base longitudinally spaced apart from each other, each protrusion defining a respective free end opposed to the base, the protrusions defining recesses between adjacent ones of the protrusions, each recess defining a nadir, the nadirs being located along a rectilinear base line, the protrusions each defining a respective length between the free end and the base line;
    wherein at least one pair of the protrusions flanking one of the recesses includes a longer protrusion and a shorter protrusion, the shorter and longer protrusions having different lengths, the shorter protrusion being in front of the longer protrusion;
  the comb being mounted to a linear actuator with the base line substantially parallel to the conveyor, the linear actuator being operable to move the comb in a direction substantially perpendicular to the predetermined rectilinear path;
  wherein, in operation, the articles are conveyed along the predetermined path and the comb is moved in a reciprocating motion by the linear actuator to engage successively subsets of the articles to space apart the articles within each subset.

* * * * *